United States Patent
Schellhardt et al.

(12)

(10) Patent No.: US 6,561,810 B1
(45) Date of Patent: May 13, 2003

(54) METHOD AND APPARATUS FOR TEACHING CHILDREN ABOUT FLUID PIPING SYSTEMS

(76) Inventors: Thomas P. Schellhardt, 700 Rush Creek Dr., Allen, TX (US) 75002; Timothy M. Schellhardt, 10724 Forest Circle Dr., St. Louis, MO (US) 63128

( * ) Notice: Subject to any disclaimer, the term of this patent is extended or adjusted under 35 U.S.C. 154(b) by 0 days.

(21) Appl. No.: 09/558,568

(22) Filed: Apr. 26, 2000

(51) Int. Cl.[7] .................. G09B 19/00; G09B 25/00; G09B 9/00
(52) U.S. Cl. .................. 434/126; 434/300; 434/365; 446/89
(58) Field of Search .................. 434/126, 154, 434/187, 219, 365, 300, 302, 276, 433, 72, 73, 226; 446/89, 85

(56) References Cited

U.S. PATENT DOCUMENTS

| | | | |
|---|---|---|---|
| 4,170,839 A | * 10/1979 | O'Donnell | 434/126 |
| 4,550,876 A | 11/1985 | Kulesza et al. | |
| 4,934,939 A | 6/1990 | Bonneville | |
| 5,022,588 A | 6/1991 | Haase | |
| 5,111,993 A | 5/1992 | Baker | |
| D337,150 S | 7/1993 | Klee | |
| 5,224,652 A | 7/1993 | Kessler | |
| 5,385,472 A | * 1/1995 | Mullin | 434/126 |
| 5,405,294 A | * 4/1995 | Briggs | 472/128 |
| 5,480,336 A | * 1/1996 | Blanchard | 446/89 |
| 5,505,380 A | 4/1996 | Jun | |
| 5,873,863 A | * 2/1999 | Komlosi et al. | 434/272 |
| 5,878,956 A | 3/1999 | Djukastein et al. | |
| 5,941,712 A | * 8/1999 | Smith | 434/365 |
| 6,076,545 A | * 6/2000 | Copper | 137/360 |
| 6,164,972 A | * 12/2000 | Winslow | 434/219 |
| 6,318,383 B1 | * 11/2001 | Wood | 134/22.1 |

FOREIGN PATENT DOCUMENTS

GB   2048088   * 4/1979

OTHER PUBLICATIONS

Splash 'n' Dash, Sport Fun, Inc., Circa. 2000.

* cited by examiner

*Primary Examiner*—Jacob K. Ackun
*Assistant Examiner*—Bena B. Miller
(74) *Attorney, Agent, or Firm*—Thompson Coburn LLP

(57) ABSTRACT

An apparatus for teaching a child about basic fluid piping systems comprises a kit having a plurality of pipes and pipe fittings, and a media embodying element, all of which are packaged together for sale. The pipes and pipe fittings come in a variety of shapes, sizes and types and are adapted to be interconnected with one another to form a variety of operable fluid piping systems. The media embodying element includes media that conveys information in a form that can be comprehended by children about the manner in which the pipes and pipe fittings may be interconnected with one another to form various fluid piping systems, which are adapted for connection to a water source for operating the fluid piping systems. An associated method comprises the steps of providing a water source; supplying a child with a plurality of pipes and pipe fittings that are adapted to be interconnected with one another; and equipping the child with a media embodying element that conveys information to the child about the manner in which the pipes and pipe fittings may be interconnected with one another to form a variety of operable fluid piping systems supplied with water from the water source.

4 Claims, 4 Drawing Sheets

METHOD AND APPARATUS FOR TEACHING CHILDREN ABOUT FLUID PIPING SYSTEMS

BACKGROUND OF THE INVENTION

The present invention relates to a method and apparatus for entertaining children and teaching them about basic fluid piping systems. More particularly, the present invention relates to a method and apparatus that educates and entertains children, while increasing their mechanical aptitude, by providing an opportunity to work "hands-on" with a plurality of pipes and pipe fittings that can be interconnected with one another to build a variety of basic, yet fully functional, fluid piping systems.

Various educational construction toys exist, such as Hasbro, Inc.'s Tinkertoy® and Meccano S.A.'s Erector® Set, which give children an opportunity to exercise their creativity by building various structures from a plurality of interconnectable components. However, none of these toys can be used to construct operable fluid piping systems and, indeed, they were not intended to do so. Consequently, these toys teach children nothing about basic plumbing or fluid piping systems.

The marketplace is also replete with various toy water sprinklers and toy lawn sprinklers for purposes of amusement and outdoor entertainment, especially on hot and humid summer days. Such water sprinklers are typically connectable to an outdoor water faucet and comprise one or more nozzles for scattering or spraying a flow of water. Amusement and entertainment are the primary purposes of such toy water sprinklers, which allow children to play and cool off in the streams of water. However, these toy water sprinklers and toy lawn sprinklers are generally sold in a substantially pre-assembled condition and are intended for use in one or only a few different configurations. As such, these sprinklers do not provide an opportunity for children to exercise any creativity in constructing fluid piping systems of their own and, consequently, they do not teach children anything about basic plumbing or fluid piping systems.

Thus, there is a need for an apparatus and method for teaching children about basic fluid piping systems, which gives children an opportunity to exercise creativity by building operable fluid piping systems of their own, while at the same time providing entertainment and amusement.

SUMMARY OF THE INVENTION

It is an object of the present invention is to provide a method and apparatus for educating children about basic fluid piping systems. Another object is to provide a kit having a plurality of pipes and pipe fittings that may be interconnected with one another to form a variety of operable fluid piping systems. Still another object is to provide a kit comprising a fluid pressure gauge and/or at least one sprinkler for teaching a child about fluid pressure characteristics of basic fluid piping systems. A further object is to provide a method of teaching children about basic fluid piping systems and about fluid pressure characteristics thereof, while at the same time providing entertainment and amusement.

In general, an apparatus of the present invention for teaching a child about basic fluid piping systems comprises a kit having a plurality of pipes and pipe fittings, and a media embodying element, all of which are packaged together for sale. The pipes and pipe fittings come in a variety of shapes, sizes and types, as hereinafter described, and are adapted to be interconnected with one another. The media embodying element includes media that conveys information in a form that can be comprehended by children about the manner in which the pipes and pipe fittings may be interconnected with one another to form a variety of operable fluid piping systems, which are adapted for connection to a water source for operating the fluid piping systems.

In another aspect of the invention, a kit is provided for teaching a child about fluid pressure characteristics of basic fluid piping systems. The kit includes a plurality of pipes and pipe fittings, at least one fluid pressure gauge for measuring fluid pressure, and a media embodying element. At least one of the pipes and pipe fittings is adapted for connection to a water source. The fluid pressure gauge is also adapted for connection to at least one of the pipes and pipe fittings. The media embodying element includes media that conveys information in a manner that can be comprehended by children about the manner in which the pipes and pipe fittings may be interconnected with one another to form a variety of operable fluid piping systems having different fluid pressure characteristics. The media embodying element also includes media that conveys information to the child about the manner in which the fluid pressure gauge may be connected to the fluid piping systems and monitored by the child to compare the fluid pressure characteristics of the various systems with one another.

A method of the present invention comprises the steps of providing a water source; supplying a child with a plurality of pipes and pipe fittings that are adapted to be interconnected with one another; and equipping the child with a media embodying element. At least one of the pipes and pipe fittings is adapted for connection to the water source. The media embodying element includes media that conveys information to the child about the manner in which the pipes and pipe fittings may be interconnected with one another to form a variety of operable fluid piping systems supplied with water from the water source.

In another aspect of the invention, a method is provided for teaching a child about fluid pressure characteristics of basic fluid piping systems. This method includes the steps of providing a water source; supplying the child with a plurality of pipes and pipe fittings that are adapted to be interconnected with one another; supplying the child with at least one fluid pressure gauge for measuring fluid pressure; and equipping the child with a media embodying element. The media embodying element includes media that conveys information to the child about the manner in which the pipes and pipe fittings may be interconnected with one another to form a variety of operable fluid piping systems supplied with water from the water source. The media embodying element also includes media that conveys information to the child about the manner in which the fluid pressure gauge may be connected to each of the fluid piping systems and then monitored by the child to compare the fluid pressure characteristics of each of the systems with one another.

In still another aspect of the invention, a method for teaching a child about fluid pressure characteristics of basic fluid piping systems comprises the steps of providing a water source; supplying the child with a plurality of pipes and pipe fittings that are adapted to be interconnected with one another; supplying the child with first and second sprinklers; and equipping the child with a media embodying element. The first sprinkler requires a first minimum fluid pressure level for proper operation and the second sprinkler that requires a second minimum fluid pressure level for proper operation. The second minimum fluid pressure level is greater than the first minimum fluid pressure level. Each of the first and second sprinklers is adapted for connection to at least one of the pipes and pipe fittings. The media embodying element includes media that conveys information to the child about the manner in which the pipes, pipe fittings and first and second sprinklers may be selectively interconnected with one another in various combinations to form a variety of operable fluid piping systems having different fluid pressure characteristics. The media embodying element also includes media that explains how the child can compare the different fluid pressure characteristics of the various fluid piping systems by monitoring the operation of said first and second sprinklers used therewith.

While the principal advantages and features of the present invention have been described above, a more complete and thorough understanding and appreciation for the invention may be attained by referring to the drawings and description of the preferred embodiments, which follow.

Figure 1:
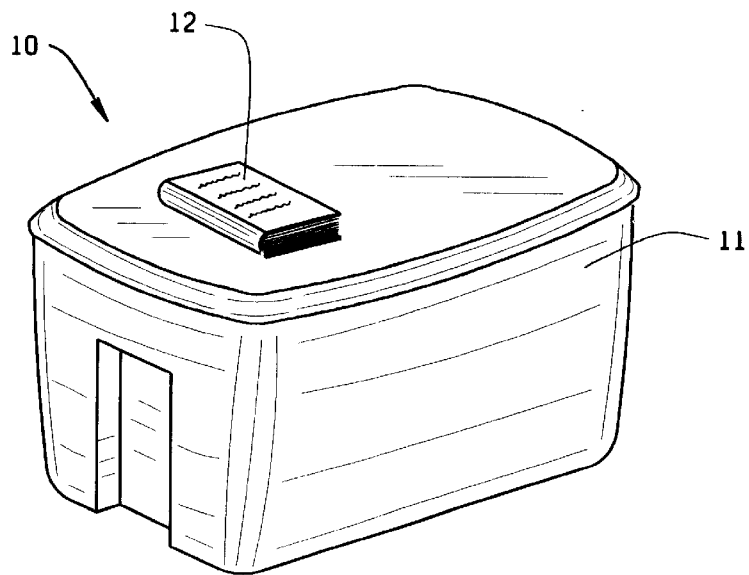
FIG. 1 shows a kit of the present invention for teaching a child about basic fluid piping systems.

Reference characters in these Figures correspond to reference characters in the following detailed description of the preferred embodiments.

DETAILED DESCRIPTION OF THE PREFERRED EMBODIMENTS

Referring now to FIG. 1, the present invention comprises a kit 10 for teaching a child about basic fluid piping systems. The kit 10 comprises a plurality of interconnectable pipes and pipe fittings (shown and described hereinafter) that can be interconnected to form a variety of operable fluid piping systems. Preferably, the kit includes a light-weight storage container 11 for convenient storage and transportation of the various pipes and pipe fittings when not in use. The kit also contains a media embodying element 12 including media that conveys information about the manner in which the various components may be interconnected with one another to form the various fluid piping systems. As described hereinafter, the interconnectable pipes and pipe fittings are preferably packaged together for sale along with the media embodying element 12.

Figure 2:
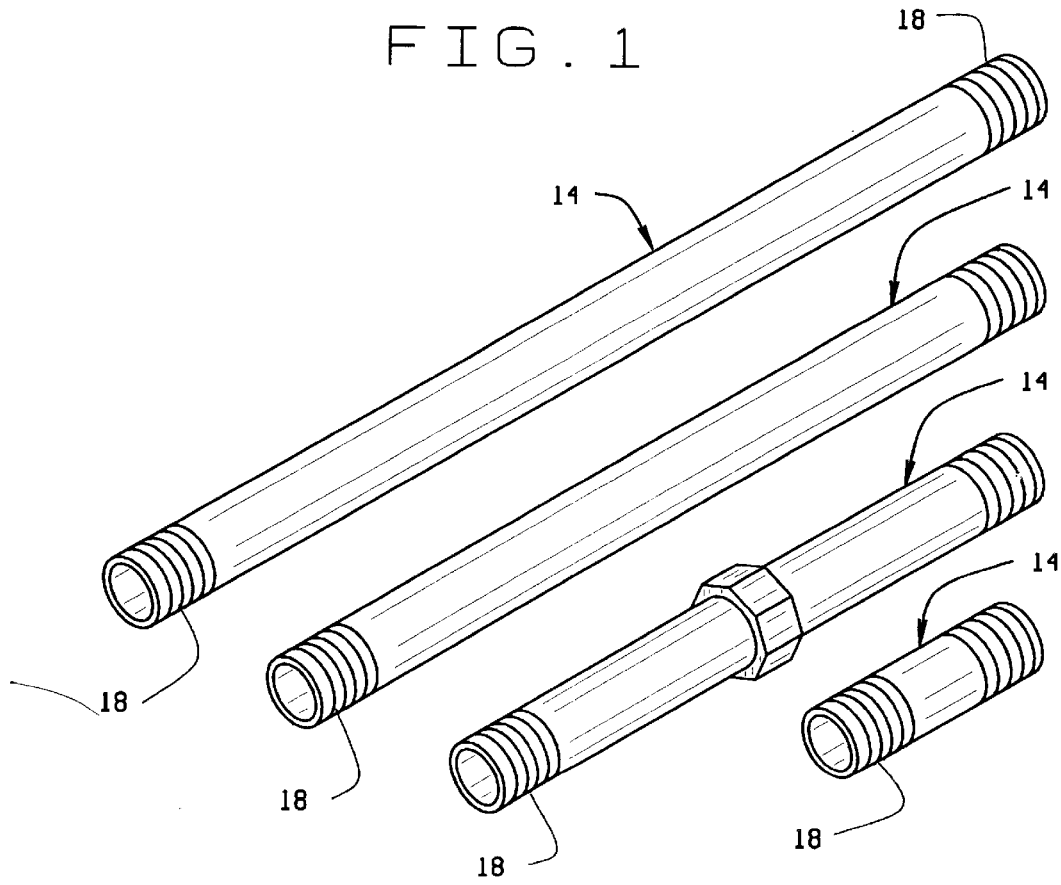
FIG. 2 depicts examples of various pipes comprising components of a kit of the present invention for teaching a child about basic fluid piping systems.

As shown in FIG. 2, the kit comprises a plurality of pipes 14 varying in length. The pipes have a hollow interior adapted for conveying fluid. Preferably, end portions 18 of each pipe are externally threaded to accept various threaded pipe fittings, as described below. The particular pipes shown in FIG. 2 are ½" diameter pipes, but the various sizes and configurations of pipe shown in FIG. 2 are for illustrative purposes only. It should be understood that any number of pipes having various diameters, lengths and shapes could be used without departing from the scope of the present invention. Also, although the pipes shown in FIG. 2 are depicted as being opaque, transparent or translucent pipes could also be used without departing from the scope of the invention. In addition, curved pipes or flexible pipes (e.g., hoses) could be used without departing from the scope of the invention. The pipes 14 shown in FIG. 2 are of the type commonly available at most any hardware, plumbing or lawn and garden store.

Figure 3:
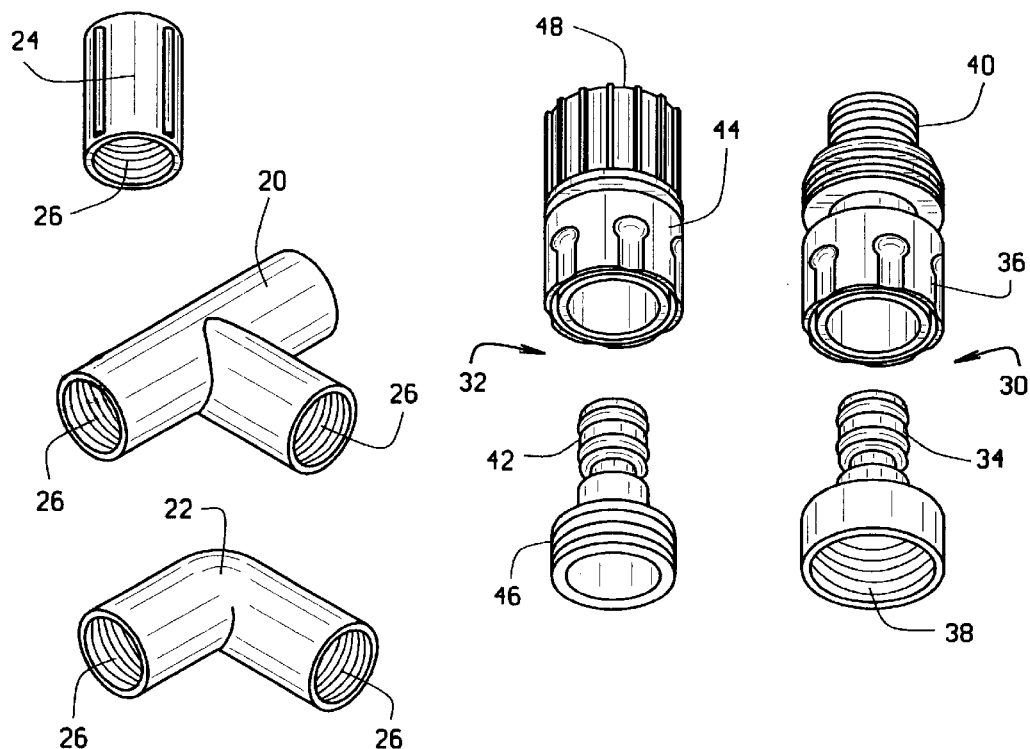
FIG. 3 depicts examples of various pipe fittings comprising components of a kit of the present invention.

As shown in FIG. 3, the kit further comprises a plurality of pipe fittings. In particular, the kit preferably includes one or more T-connectors 20, elbow connectors 22, and linear connectors 24 for connecting the pipes 14 to one another. The connectors 20, 22 and 24 include internally threaded portions 26 adapted for threaded engagement with the externally threaded end portions 18 of the pipes 14 for connecting the pipes to one another. Thus, the T-connectors 20 can be used to connect three pipes together in a T-shaped formation, the elbow connectors 22 can be used to connect two pipes at an angle relative to one another, and the linear connectors 24 can be used to connect two pipes together end-to-end. The particular connectors 20, 22 and 24 shown in FIG. 3 are for illustrative purposes only. Other connector configurations could be used without departing from the scope of the invention. For example, although the elbow connector 22 shown in FIG. 3 is configured to connect two pipes to together at a 90 degree angle, elbow connectors configured to connect two pipes to together at acute or obtuse angles could also be used. Also, although the connectors 20, 22 and 24 shown in FIG. 3 are depicted as being opaque, transparent or translucent connectors could also be used without departing from the scope of the invention. The connectors 20, 22 and 24 shown in FIG. 3 are of the type commonly available at most any hardware, plumbing or lawn and garden store.

Preferably, the kit also comprises a plurality of quick-connect type connectors, two of which are represented in FIG. 3 by the reference numerals 30 and 32. The connector 30 includes a male portion 34 and a female portion 36 adapted for a snap-fit engagement with one another, as is well known in the art. The male portion 34 of the connector 30 includes an internally threaded portion 38 sized to receive the externally threaded end portions 18 of the pipes 14, an externally threaded end of a standard garden hose (not shown), or an externally threaded end of a standard faucet (not shown). The female portion 36 of the connector 30 includes an externally threaded portion 40 sized for threaded engagement with an internally threaded end of a standard garden hose (not shown) or other fittings used with the invention described herein as having internally threaded portions. The connector 32 also includes a male portion 42 and a female portion 44 adapted for a snap fit engagement with one another. The male portion 42 of the connector 32 includes an externally threaded portion 46 sized for threaded engagement with an internally threaded end of a standard garden hose (not shown) or other fittings used with the invention described herein as having internally threaded portions. The female portion 44 of the connector 32 includes an internally threaded portion 48 sized to receive the externally threaded end portions 18 of the pipes 14, an internally threaded end of a standard garden hose (not shown), or an internally threaded end of a standard faucet (not shown). The use of quick-connect type connectors of this type is not critical to the invention, but is preferred because such connectors are easy and efficient to operate, even by young children. Quick-connect type connectors of this type are sold by Cameo Manufacturing and a wide variety of other manufacturers, and are commonly available at most any hardware, plumbing or lawn and garden store.

Figure 4:
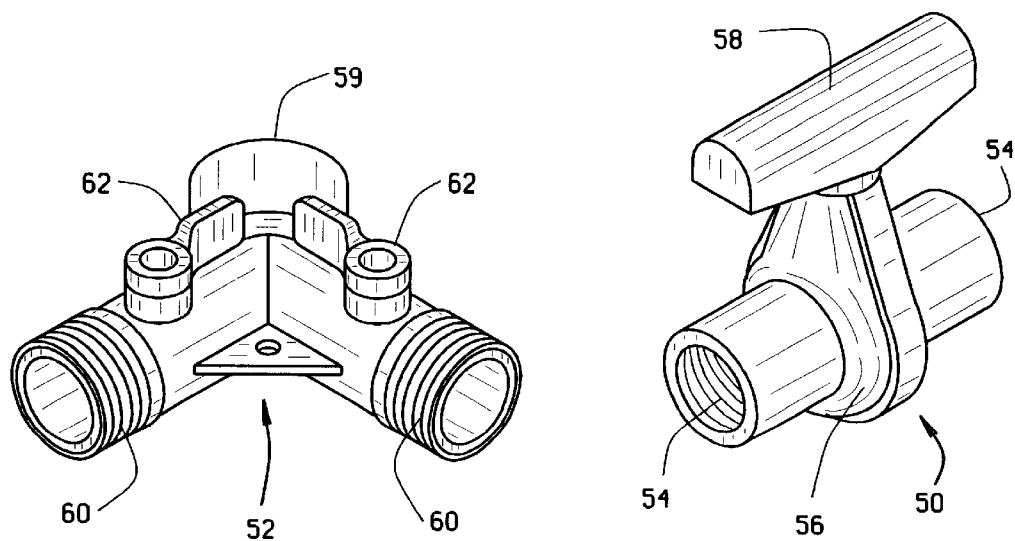
FIG. 4 depicts an example of various valves that may be used in the present invention.

FIG. 4 depicts an example of various valves, represented generally by the reference numerals 50 and 52, that may be used in the present invention. Like the linear connector 24 discussed above, the valve 50 includes internally threaded portions 54 adapted for threaded engagement with the externally threaded end portions 18 of the pipes 14 for connecting two of the pipes together end to end. The interior of the valve housing 56 is hollow and includes a ball valve element (not shown) that is moveable between an open position and a closed position. A handle 58 is operatively connected to the ball valve element for manually moving the ball valve element between its open and closed positions. When the ball valve is in its open position, a passage in the ball valve allows fluid to flow through the valve housing 56 from one end to the other. When the ball valve is in its closed position, it blocks the flow of fluid through the valve housing 56.

The valve 52 has a generally Y-shaped configuration. The valve 52 includes an internally threaded portions 59 at the trunk of the "Y" adapted for threaded engagement with the externally threaded end portions 18 of the pipes 14. The valve also includes two externally threaded portions 60 at distal ends of the arms of the "Y" adapted for threaded engagement with an internally threaded end of a standard garden hose (not shown) or any of the other fittings used with the invention described herein as having internally threaded portions. The interior of the valve housing 60 is hollow and includes two ball valve elements (not shown), one in each arm of the "Y", which function similarly to the ball valve element of the valve 50 described above. Handles 62 are operatively connected to the ball valve elements for manually moving the ball valve element between open and closed positions. The valves 50 and 52 are of the type commonly available at most any hardware, plumbing or lawn and garden store. Other suitable valves could be used in the kit 10 without departing from the scope of the present invention. However, preferably, such valves should be hand operable without the need for tools.

Figure 5:
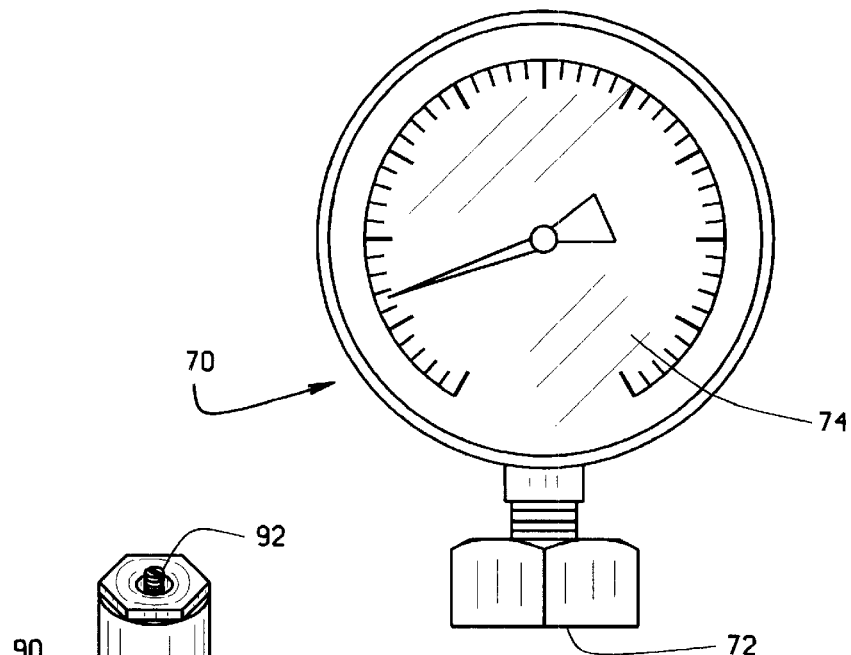
FIG. 5 depicts an example of a fluid pressure gauge that may be used in the present invention.

As shown in FIG. 5, the kit further comprises a fluid pressure gauge 70. The gauge 70 is conventional and includes an internally threaded portion 72 adapted for threaded engagement with the externally threaded end portions 18 of the pipes 14 or externally threaded portions of other components used with the invention. The gauge includes a readable display 74, which shows the fluid pressure in the fluid piping system to which the gauge 70 is connected, as described hereinafter. The gauge 70 is of the type commonly available at most any hardware, plumbing or lawn and garden store. While the gauge depicted in the figures and described above is an analog pressure gauge with a dial-type display, other types of analog or digital gauges could be used without departing from the scope of the present invention.

Figure 6:
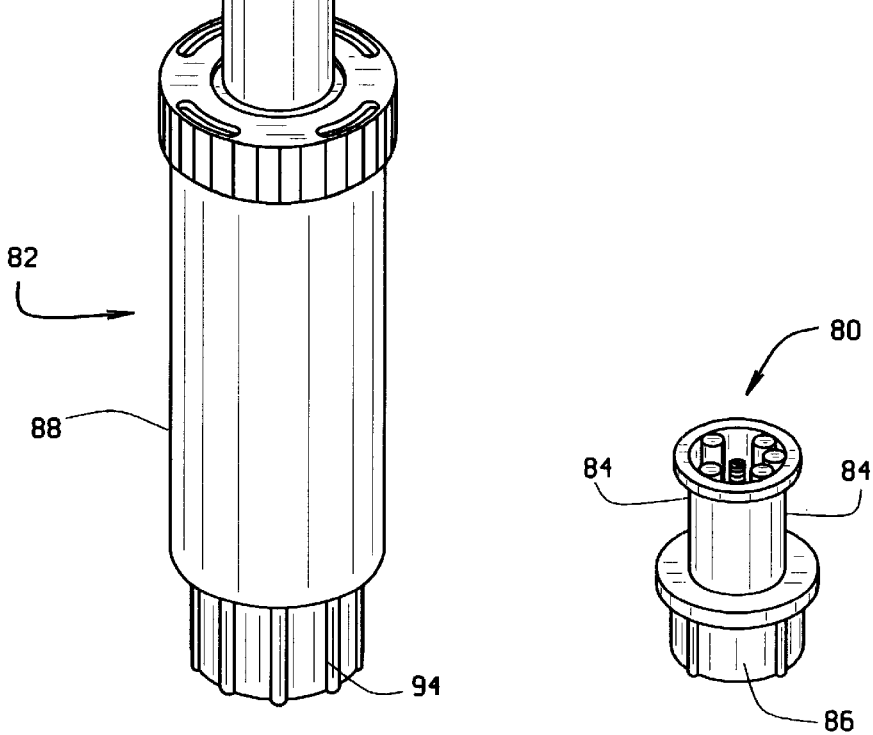
FIG. 6 depicts examples of various sprinklers that may be used in the present invention.

FIG. 6 shows examples of two different sprinklers, represented generally by the reference numerals 80 and 82, that may be used in the present invention.

Sprinkler 80 is a common shrub mister, which includes nozzles 84 near its upper end adapted for discharging a mist of water over a relatively small area, e.g., a 5-foot radius. The sprinkler 80 includes an internally threaded portion 86 adapted for threaded engagement with the externally threaded end portions 18 of the pipes 14 or externally threaded portions of other components used with the invention. Sprinkler 80 does not have any moving parts and requires a relatively low minimum fluid pressure for proper operation, e.g., approximately 5–10 p.s.i.

Sprinkler 82 is a common "pop-up" type sprinkler having a hollow housing 88, which holds a pop-up stem 90. The stem 90 is also hollow and includes a nozzle 92 at its upper end adapted for discharging water over a moderately sized area, e.g., a 10-foot radius. The stem 90 is moveable between an extended position (shown in FIG. 6) and a retracted position (not shown) relative to the housing 88. A coil spring (not shown) within the housing 88 biases the stem 90 toward its retracted position within the housing 88. The sprinkler 82 includes an internally threaded portion 94 adapted for threaded engagement with the externally threaded end portions 18 of the pipes 14 or externally threaded portions of other components used with the invention. In operation, fluid pressure within the piping system to which the sprinkler 82 is connected forces the stem 90 upwardly to its extended position against the bias of the spring and water is discharged through the nozzle 92. Sprinkler 82 requires a higher minimum fluid pressure than the sprinkler 80 for proper operation, e.g., approximately 25 p.s.i., or the stem 90 will not "pop" up to its extended position.

The sprinklers 80 and 82 are of the type commonly available at most any hardware, plumbing or lawn and garden store. However, other types of lawn sprinklers could be used in the kit 10 without departing from the scope of the present invention. For example, rotating sprinklers sometimes referred to affectionately as a "whirly-birds" (not shown) could also be used. Such rotating sprinklers typically include a generally vertical pipe with a rotating head connected to an upper end of the vertical pipe. The rotating head includes at least two hollow arms that are in fluid communication with the vertical pipe. The arms have nozzles at their distal ends for discharging streams of water. Thus, in such rotating sprinklers, water travels upwardly through the vertical pipe, through the hollow arms, and out through the nozzles. The nozzles are shaped and positioned so that the force of the water being discharged from the nozzles imparts a rotating motion to the head. Sprinklers of this type generally require a relatively low minimum fluid pressure for proper operation.

The pipes 14, connectors 20, 22 and 24, quick-connect connectors 30 and 32, valves 50 and 52, pressure gauge 70 and sprinklers 80 and 82 are preferably packaged together for sale as part of the kit 10 along with the media embodying element 12. Again, other than the media embodying element 12, each of the individual components listed above is commonly available at most any hardware, plumbing or lawn and garden store, and could also be purchased individually for purposes of practicing the method of the present invention described below, even if the kit 10 is not purchased. Also, although the kit 10 of the present invention has been described as containing certain specific components (e.g., the pipes 14, connectors 20, 22 and 24, quick-connect connectors 30 and 32, valves 50 and 52, pressure gauge 70 and sprinklers 80 and 82, it should be understood that additional components and accessories could be included in the kit 10 (or in supplemental or advanced kits) without departing from the scope of the invention. For example, advanced kits may include water pressure boosters for increasing the available water pressure and enabling the assembly of more advanced fluid piping systems. Preferably, all of these components are interconnectable with one another by children without the need for tools.

As discussed above, the kit 10 comprises a media embodying element 12 (FIG. 1) including media that conveys information about the manner in which the various components of the kit 10 may be interconnected with one another to form a variety of operable fluid piping systems. Preferably, the media embodying element, 12 is a written instruction sheet containing textual and/or graphical information in a form and at a level that can be comprehended by young children, e.g., from about age 7 or from about a first grade level. However, the media embodying element 12 may also be in the form of a video cassette, audio cassette, compact disc, DVD, floppy disk, or other machine readable format containing information about the manner in which the various components of the kit 10 may be interconnected with one another to form a variety of operable fluid piping systems.

Some or all of the pipes 14, connectors 20, 22 and 24, quick-connect connectors 30 and 32, valves 50 and 52, pressure gauge 70 and sprinklers 80 and 82 may be color-coded, shape-coded, or coded with indicia to assist the child in interconnecting them in accordance with the instructions provided by the media embodying element 12.

In an alternative embodiment of the invention, the conventional sprinklers discussed above (or other types of sprinklers) are contained in specially formed housings (not shown) having shapes of familiar characters, animals, clowns, etc., to increase the value and appeal of the kit as a toy. In still another embodiment of the invention, the sprinklers may be contained in specially formed housings (not shown) having shapes of simple geometric shapes, letters, numbers, etc., to increase the educational value of the kit.

Figure 7:
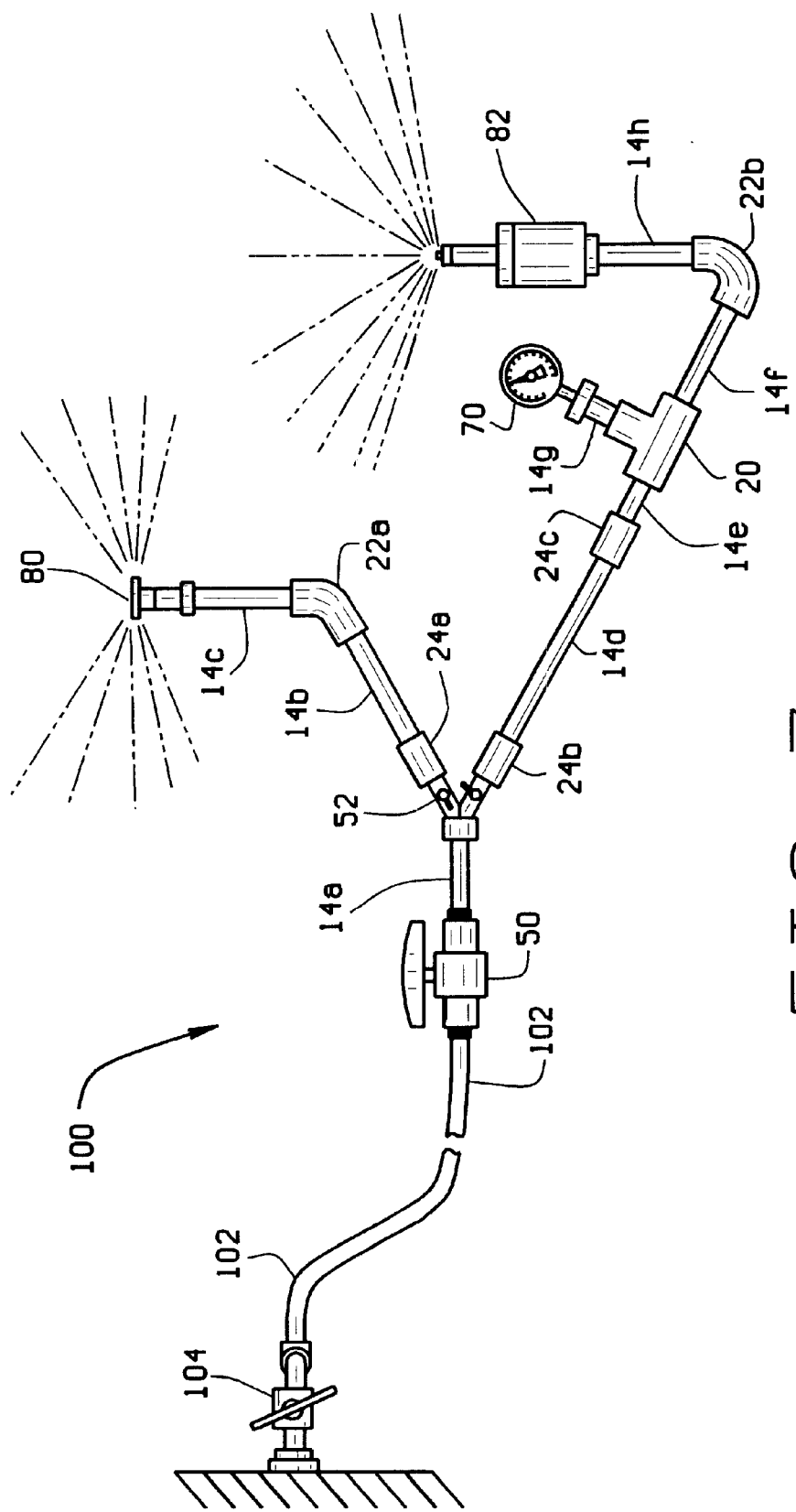
FIG. 7 is an illustrative example of a fluid piping system that may be assembled using the various components included in the kit of the present invention.

FIG. 7 is an illustrative example of a fluid piping system, represented generally by the reference numeral 100, that may be assembled using the various components included in the kit 10 of the present invention. In this example, one end of a common garden hose 102 is connected to a water source 104. A valve 50 is connected to the oppose end of the garden hose. A pipe 14a connects the valve 50 to a "Y" shaped valve 52. A linear connector 24a is used to connected another pipe 14b to one arm of the "Y" shaped valve 52. Another pipe 14c is connected to the pipe 14b with an elbow connector 22a. A shrub mister type sprinkler 80 is connected to the pipe 14c. Another linear connector 24b is used to connect a pipe 14d to the other arm of the "Y" shaped valve 52. A third linear connector 24c is used to connect a short pipe 14e to the pipe 14d. A "T" shaped connector 20 is used to connect another pipe 14f to the short pipe 14e. A fluid pressure gauge 70 is connected to the trunk of the "T" shaped connector 20 with another short pipe 14g. Another elbow connector 22b connects the pipe 14f to another pipe 14h, to which a pop-up sprinkler 82 is connected.

Thus, when the water source 104 is turned on, water flows through the garden hose 102 to the fluid piping system 100. When the valve 50 is open, the water will flow through the pipe 14a to the "Y" shaped valve 52. When the valve in the first arm of the "Y" is open, water will flow through pipes 14b and 14c to the sprinkler 80. If the fluid pressure at this point is sufficient, the sprinkler 80 will discharge a mist of water. When the valve in the second arm of the "Y" is open, water will flow through pipes 14d, 14e, 14f and 14h to the sprinkler 82. If the fluid pressure at this point is sufficient, the sprinkler 82 will discharge a spray of water. As discussed above, the sprinkler 82 requires a higher minimum fluid pressure for proper operation than the sprinkler 80. In the fluid piping system 100 shown in FIG. 7, the child can determine if the sprinkler 82 is getting sufficient fluid pressure for proper operation by monitoring the fluid pressure gauge 70 or simply by monitoring the performance of the sprinkler 82. If the sprinkler 82 is not getting sufficient fluid pressure for proper operation, the child may decide to shut the valve in the first leg of the "Y" to stop the flow of fluid through the sprinkler 80, thereby increasing the fluid pressure to the sprinkler 82, or may decide to increase the fluid pressure at the water source 104.

The fluid piping system 100 shown in FIG. 7 is just one example of the various systems that may be assembled using the kit 10 of the present invention, and the sequence of monitoring the fluid pressure to the sprinklers 80 and 82 described above is just one possible scenario. Innumerable other piping systems and operating scenarios could be described in the media embodying element 12 without departing from the scope of the invention.

Moreover, unlike prior art toy water sprinklers and toy lawn sprinklers, which generally come pre-assembled, the present invention provides an excellent opportunity for children to be creative and to exercise their own imaginations by creating, designing building, forming, constructing and operating the myriad fluid piping systems that are possible using the various components of the kit 10. Children may follow the examples provided in the media embodying element 12 or may instead design their own piping systems. Preferably, examples provided in the media embodying element 12 will provide a starting point, which familiarizes children with the various components of the kit 10 and how they interconnect with one another.

While the media embodying element 12 preferably contains information that can be used as a roadmap or guide for using the kit 10 and for building certain predesigned piping systems with the various components thereof, there is no wrong way to assemble the various components of the kit 10. Children will learn through experimentation that certain system configurations work better than others. By monitoring the displays of the gauges and/or by monitoring the performance of the various sprinklers, children can troubleshoot and then modify the their system to correct performance problems. The kit 10 of the present invention gives children the opportunity to build self esteem and a sense of accomplishment by independently building working fluid piping systems of their own, which they are able to show and proudly share with parents, friends, etc.

Also, because the kit is intended to be connected to an ordinary household water source 104, which has a safe level of water pressure, the various components of the kit will not be damaged under normal use. Thus, children are free to experiment with water pressure by manipulating the valves, connectors, sprinklers and other components of the kit 10.

In addition to all of the educational and mind building aspects of the invention discussed above, the present invention can provide children with hours of amusement and entertainment. The operation of the sprinklers themselves and their various modes of operation intrigue children. Also, once a fluid piping system has been assembled in a desired configuration, children can enjoy the benefits of the sprays and streams of water projecting from the sprinklers. Moreover, having a goal in mind for particular spray patterns from the beginning (e.g., water fountains, waterfalls, dry tunnels, etc.), children can experiment the various components of the kit 10 to design a fluid piping system that will achieve their pre-conceived goal.

While the present invention has been described by reference to specific embodiments and specific uses, it should be understood that other configurations and arrangements could be constructed, and different uses could be made, without departing from the scope of the invention as set forth in the following claims.

What is claimed is:

1. A method of teaching a child about basic fluid piping systems, the method comprising the steps of:

providing a water source;

supplying the child with a plurality of pipes and pipe fittings, at least one of said pipes and pipe fittings being adapted for connection to said water source;

equipping the child with a media embodying element containing visual instructions that illustrate steps to be taken to interconnect said pipes and pipe fittings with one another in a variety of different configurations to form a variety of different operable fluid piping systems supplied with water from said neater source;

supplying the child with at least one fluid pressure gauge for measuring fluid pressure, said fluid pressure gauge being adapted for connection to another one of said pipes and pipe fittings, said fluid pressure gauge including a readable display that shows the fluid pressure in a fluid piping system to which the gauge is connected, wherein said media embodying element contains visual instructions that illustrate steps to be taken to operably connect said fluid pressure gauge to said operable fluid piping systems and to monitor said gauge to compare fluid pressures of said variety of different operable fluid piping systems with one another; and directing the child to interconnect said plurality of pipes and pipe fittings and said fluid pressure gauge with one another in a selected one of a variety of different configurations to form a selected one of a variety of different operable fluid piping systems.

2. The method of claim 1 further comprising the step of supplying the child with at least one sprinkler adapted for connection to at least one of said pipes and pipe fittings, wherein said media embodying element contains visual instructions that illustrate the manner in which said sprinkler is interconnectable with said pipes and pipe fittings as a component of said operable fluid piping systems.

3. The method of claim 2 wherein said at least one sprinkler comprises a first sprinkler that requires a first minimum fluid pressure level for proper operation, and wherein the method further comprises the step of supplying the child with a second sprinkler that requires a second minimum fluid pressure level for proper operation, the second minimum fluid pressure level being greater than the first minimum fluid pressure level, the second sprinkler being adapted for connection to at least one of said pipes and pipe fittings, wherein said media embodying element contains visual instructions that illustrate the manner in which said pipes, pipe fittings and first and second sprinklers are interconnectable with one another in various combinations to form a variety of operable fluid piping systems having different fluid pressure characteristics that are comparable with one another by monitoring the operation of said first and second sprinklers.

4. A method of teaching a child about fluid pressure characteristics of basic fluid piping systems, the method comprising the steps of:

providing a water source;

supplying the child with a plurality of pipes and pipe fittings, at least one of said pipes and pipe fittings being adapted for connection to said water source;

supplying the child with at least one fluid pressure gauge for measuring fluid pressure, said fluid pressure gauge being connectable to at least one of said pipes and pipe fittings, said fluid pressure gauge including a readable display that shows the fluid pressure in a fluid piping system to which the gauge is connected;

equipping the child with a media embodying element containing visual instructions that illustrate steps to be taken to interconnect said pipes and pipe fittings with one another in a variety of different configurations to form a variety of different operable fluid piping systems supplied with water from said water source, said media embodying element also containing visual instructions that illustrate steps to be taken to operably connect said fluid pressure gauge to said operable fluid piping systems and to monitor said gauge to compare fluid pressures of said variety of different operable fluid piping systems with one another; and directing the child to interconnect said plurality of pipes and pipe fittings and said fluid pressure gauge with one another in a selected one of a variety of different configurations to form a selected one of a variety of different operable fluid piping systems.

* * * * *